Figure 1:
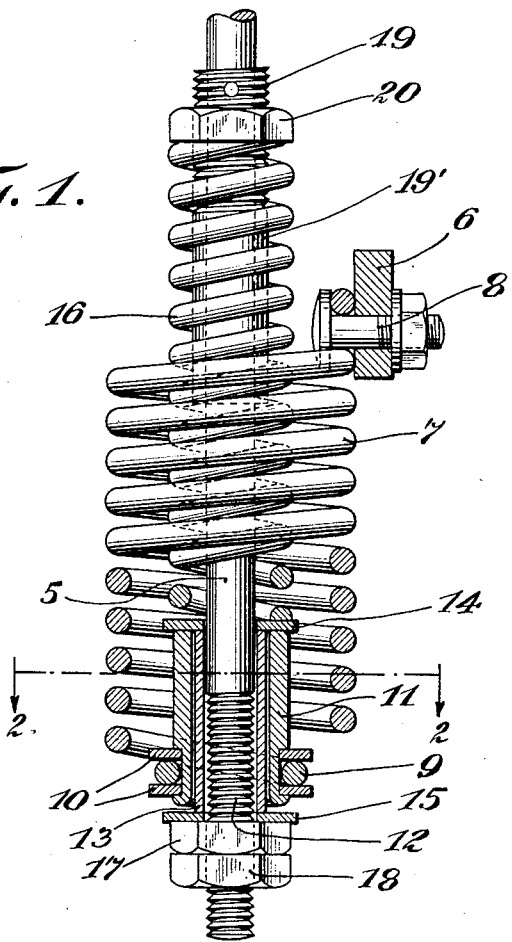

June 23, 1931.  H. MESINGER  1,811,403

ADJUSTING MEANS FOR SPRING CUSHIONING DEVICES

Filed Dec. 10 1928

INVENTOR
Henry Mesinger
BY
his ATTORNEY

Patented June 23, 1931

1,811,403

UNITED STATES PATENT OFFICE

HENRY MESINGER, OF MOUNT VERNON, NEW YORK

ADJUSTING MEANS FOR SPRING CUSHIONING DEVICES

Application filed December 10, 1928. Serial No. 324,843.

This invention relates to adjusting means for spring cushioning devices, and has for its general object and purpose to provide a simple and easily operable means for quickly adjusting and regulating the action of cushioning springs such as are generally employed in connection with motorcycles, bicycles and other machines adapted to be subjected to variable weights or pressures.

It is a more particular object of the invention to provide an adjusting means for cushioning devices of that character having an inner compression spring and an outer expansion spring, the inner spring surrounding a hanger rod suitably attached to the motorcycle saddle and the outer spring being attached at its upper end to the cycle frame, said means including a manually adjustable device on the hanger rod for adjusting the tension of both of said springs.

It is also an additional feature of the invention to provide means on the hanger rod and cooperating with the upper end of the inner compression spring whereby said spring may be adjusted independently of the outer spring.

With the above and other objects in view, the invention consists in the improved adjusting means for the cushioning devices, and in the form, proportion and relative arrangement of its several parts as will be hereinafter more fully described, illustrated in the accompanying drawings, and subsequently incorporated in the subjoined claims.

In the drawings, wherein I have illustrated one simple and satisfactory embodiment of the invention, and in which similar reference characters designate corresponding parts throughout the several views,—

Figure 2:
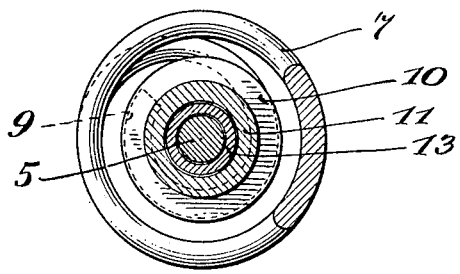

Figure 1 is an elevation partly in section showing one form of my invention as applied to one set of cushioning springs of the motorcycle saddle, and Figure 2 is a horizontal sectional view taken on the line 2—2 of Fig. 1.

Referring in detail to the drawings, for purposes of illustration, I have shown one vertically disposed end portion 5 of a U-shaped hanger rod such as is usually provided for motorcycle saddles, the intermediate portion of the rod being pivotally secured in suitable clamps or bracket members fixed to the under side of the saddle. 6 designates a rigidly fixed part of the cycle frame to which a terminal eye on the upper end of an expansion spring 7 is securely attached by means of the bolt 8. The lower end of this spring is also provided with an eye 9 secured between spaced washer plates 10 surrounding the lower end of a vertically disposed guide sleeve 11 and suitably fixed thereto.

The lower end of the hanger rod 5 is threaded as shown at 12 and a second sleeve 13 loosely surrounds said rod and is also loosely guided within the sleeve 11. This inner sleeve 13 is positioned between the upper and lower washer plates 14 and 15 respectively, the upper plate 14 constituting a bearing for the lower coil of the relatively small diameter inner compression spring 16 arranged on the rod 5. An adjusting nut 17 engaged with the threaded portion 12 of the rod bears against the lower washer plate 15 and is secured in its adjusted position by the lock nut 18.

Preferably, though not necessarily, I also secure upon the rod 5 at the upper end of the spring 16 a sleeve threaded at its upper end as at 19 and having an adjustable nut 20 engaged thereon constituting the upper abutment for the spring 16. The remaining portion 19' of the sleeve is unthreaded and extends downwardly within the spring 16 to a point slightly below the upper end of the outer spring 7. This sleeve serves to prevent lateral distortion or bending of the upper portion of the spring 16. The washer plate 14 normally rests upon the upper end of the sleeve 11, and since the outer expansion spring 7 is relatively heavy and stiff, it will be apparent that by adjusting the nut 20 on the threaded end of the sleeve 19, the tension of said inner spring 16 may be regulated independently of said outer spring. Also, it will be apparent that by adjusting the lower nut 17 on the rod 5 and forcing the washer plate 15 upwardly against the lower end of the sleeve 13, said inner spring will thus be compressed. It will be understood that normally, the rod 5 when not under load, is sustained against gravity movement. However, in the continued adjustment of the nut after washer 15 is brought into bearing contact against the lower end of sleeve 11, the rod 5 is drawn downwardly through said sleeve to further compress spring 16. When the compression of the inner spring 16 increases to a point where it substantially equals the resistance of the spring 7 to compression, further adjustment of the nut 17 acting against the lower end of sleeve 11 will cause a compression of both the inner and outer spring. In this manner, it is possible to so regulate and adjust the tension of the springs for either a light or heavy rider, that upon encountering depressions or obstructions in the road, resulting in transmission of shock through the vehicle wheels to the saddle seat, such shocks will be effectively absorbed and cushioned. The outer spring 7 acts to not only yieldingly sustain the saddle seat under normal riding conditions, but also checks or cushions the rebound when the saddle seat has been subjected to a particularly violent shock or jar.

From the foregoing description considered in connection with the accompanying drawings, the construction and several advantages of my improved adjusting means for spring cushions will be clearly and fully understood. It will be seen that I have provided a very simple device easily accessible for purposes of adjustment and whereby the desired regulation of the cushioning action of the springs may be easily and quickly effected. It will of course, be understood that if desired, the adjusting means 20 for the upper end of the inner spring 16 may be dispensed with, and the single means at the lower end of the outer spring relied upon whereby both springs may be adjusted.

Of course, when the shock or jar is relatively light, only the inner compression spring 16 acts to cushion such shocks, in which case the outer sleeve 11 connected with the lower end of the spring 7 remains relatively stationary, while the inner sleeve 13 moves downwardly in the outer sleeve, together with the lower end of the rod 5. I have found the arrangement of the parts as shown in the drawings to be very effective for the purpose of retaining the several elements in proper co-axial relation and relieving the outer spring of lateral or sidewise strains. However, it is to be understood that the detail parts of my present disclosure may be susceptible of more or less modification, and I accordingly reserve the privilege of resorting to all such legitimate changes therein as may be fairly embodied within the spirit and scope of the invention as claimed.

I claim:

1. In combination with cushioning means having an outer expansion spring fixed at its upper end, an inner compression spring, and a rod movable through said inner and outer springs, means for regulating the action of said cushioning springs including an abutment member on the rod engaged by the upper end of the inner spring, a sleeve surrounding said rod and connected with the lower end of the outer spring and transmitting the thrust of said inner spring thereto, and manually adjustable means on said rod to coact with said sleeve and thereby simultaneously adjust the tension of the inner and outer springs.

2. In combination with cushioning means having an outer expansion spring fixed at its upper end, an inner compression spring, and a rod movable through said inner and outer springs, means for regulating the action of said cushioning springs including an abutment member on the rod engaged by the upper end of the inner spring, a sleeve surrounding said rod and connected with the lower end of the outer spring and transmitting the thrust of said inner spring thereto, a washer plate interposed between the lower end of the inner spring and the upper end of said sleeve, said rod extending below said sleeve, an adjusting nut threaded on said rod below the sleeve, and means loosely disposed through said sleeve and bearing against said washer plate adapted for adjustment relative to the rod and the sleeve to vary the tension of said inner spring, and a washer plate interposed between said nut and the lower end of the sleeve adapted to coact with the latter to adjust the tension of the outer spring.

3. In combination with cushioning means having an outer expansion spring fixed at its upper end, an inner compression spring, and a rod movable through said inner and outer springs, means for regulating the action of said cushioning springs including an abutment member on the rod engaged by the upper end of the inner spring, a sleeve surrounding said rod and connected with the lower end of the outer spring and transmitting the thrust of said inner spring thereto, a second sleeve loosely surrounding said rod and slidable within the outer sleeve, a collar interposed between the upper ends of said sleeves and the lower end of the inner spring, said rod projecting below said sleeves, a washer plate bearing against the lower end of the inner sleeve, and an adjusting nut threaded on the rod against said washer plate to simultaneously move said sleeve longitudinally of the rod and adjust the inner and outer springs.

4. In combination with cushioning means having an outer expansion spring fixed at its upper end, an inner compression spring, and a rod movable through said inner and outer springs, means for regulating the action of said cushioning springs including a threaded sleeve fixed upon the rod, a nut threaded on said sleeve bearing against the upper end of the inner spring to adjust the tension of said spring independently of the outer spring, a sleeve surrounding said rod and connected with the lower end of the outer spring and transmitting the thrust of said inner spring thereto, and manually adjustable means on said rod to coact with said sleeve and thereby simultaneously adjust the tension of the inner and outer springs.

5. In combination with a cushioning means having an outer expansion spring fixed at its upper end and an inner compression spring extending vertically above the outer spring and a rod movable through said inner spring; a sleeve fixed to said rod extending downwardly through the inner spring and having an abutment for the upper end of said spring, said rod projecting below both the inner and outer springs, a sleeve connected with the lower end of the outer spring and surrounding said rod and transmitting the thrust of said inner spring to the outer spring, and manually adjustable means on said rod including a part extending through said sleeve for adjusting the tension of both the inner and outer springs.

6. In combination with cushioning means having an outer expansion spring fixed at one end, an inner compression spring and a rod movable through said inner and outer springs, means for simultaneously adjusting and regulating the action of said cushioning springs including an abutment on said rod engaged by the upper end of the compression spring, a movable member on said rod receiving the thrust of said compression spring and connected with the other end of the expansion spring, and means threaded on said rod manually adjustable relative thereto and coacting with the movable member to move the latter axially along the rod and thereby simultaneously adjust said springs and vary their resistance to axial movement of said rod.

In testimony that I claim the foregoing as my invention, I have signed my name hereto.

HENRY MESINGER.